(12) United States Patent
Dickes et al.

(10) Patent No.: US 6,240,498 B1
(45) Date of Patent: May 29, 2001

(54) OBJECT ORIENTED STORAGE POOL APPARATUS AND METHOD

(75) Inventors: Steven Michael Dickes; Philip Braun Winterfield, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/226,070

(22) Filed: Jan. 6, 1999

(51) Int. Cl.[7] ........................................ G06F 7/00
(52) U.S. Cl. ................................. 711/170; 707/103
(58) Field of Search ............................... 711/170; 707/103

(56) References Cited

U.S. PATENT DOCUMENTS 5,893,162 * 4/1999 Lau et al. .............................. 711/153

* cited by examiner

Primary Examiner—Jack A. Lane
(74) Attorney, Agent, or Firm—Martin & Associates, LLC; Derek P. Martin

(57) ABSTRACT

An object oriented storage pool provides enhanced performance by allowing very fast and efficient allocation of storage elements from the storage pool instead of obtaining a storage element from the heap in an object oriented computer system. The storage pool is preferably in a linked-list format, and operations on the linked list to allocate and return storage elements are atomic operations to assure serialization of accesses to the storage pool. The presence and operation of the storage pool is hidden from the user by overloading the New() and delete() methods that are defined in the programming language. In this manner the storage pool can be introduced without modification to existing application software, thereby enhancing computer system performance without changing other software in the system.

20 Claims, 6 Drawing Sheets

```
new()
{
    newEntry();
    constructor();
}
```

FIG. 5

```
template<class StorageType>
StorageType * StoragePool<StorageType>::newEntry() {
    StorageType * Entry;

do {
610     if (!(Entry = (StorageType *)ldarx(&StoragePoolP))) break;
620   } while (!stdcx((const uint64)Entry->nextP,&StoragePoolP));
630   if (Entry == NULL) {
            // get enough characters to hold the new object
640       Entry=(StorageType *)::new char[sizeof(StorageType)];
650       Entry->nextP=NULL;
660   }
    return(Entry);
}
```

FIG. 6

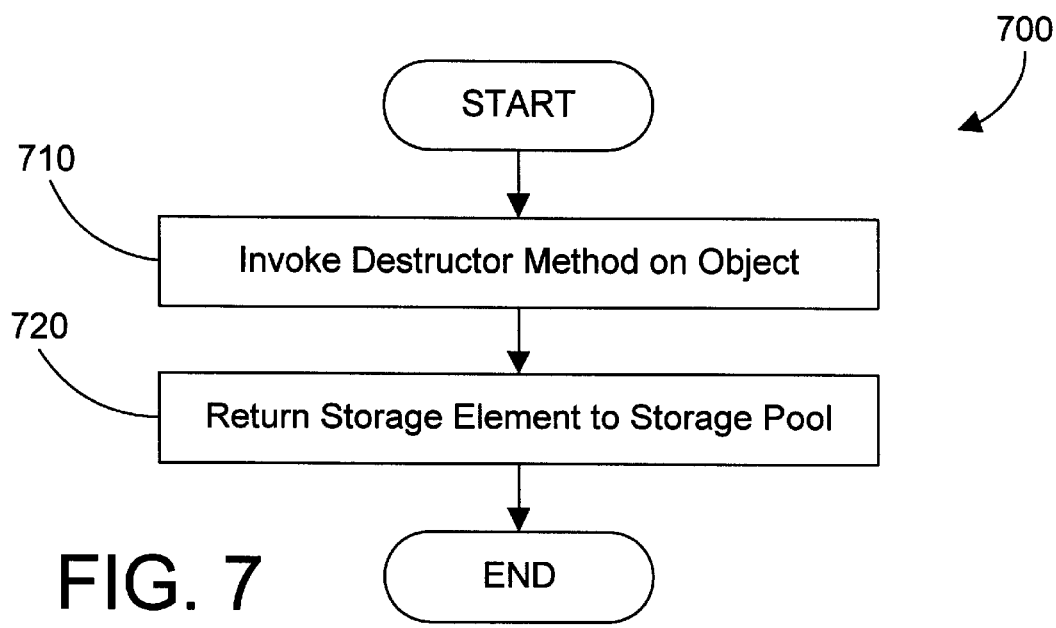

FIG. 7

```
delete()
{
        destructor();
        returnEntry();
}
```

FIG. 8

```
template<class StoragePool>
void NBEntryPool<StoragePool>::returnEntry(void * Entry) {

StoragePool * Entry = (StoragePool *) Entry do {
910 ───────── Entry->nextP = (StoragePool *) ldarx(&StoragePoolP);
920 ───  } while (!stdcx((const uint64)Entry, &StoragePoolP));
    }
```

FIG. 9

OBJECT ORIENTED STORAGE POOL APPARATUS AND METHOD

BACKGROUND OF THE INVENTION

1. Technical Field

This invention generally relates to object oriented programming and more specifically relates to an apparatus and method for allocating and freeing storage elements in an object oriented computer system.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object-oriented programming is the "class." A class is a template that defines a type of object. A class outlines or describes the characteristics or makeup of objects that belong to that class. By defining a class, objects can be created that belong to the class without having to rewrite the entire definition for each new object as it is created. This feature of object-oriented programming promotes the reusability of existing object definitions and promotes more efficient use of program code.

When an object is created in an object oriented system, it is created as an instance of a particular class. Object oriented languages typically define methods on a class that create and delete objects when the methods are invoked. The creation of an object typically involves two operations: 1) allocating storage for the object, and 2) invoking the constructor method on the class, which creates the instance of the class in the allocated storage.

Most object oriented computer systems include a "heap", which is a relatively large storage area that may be allocated in smaller pieces as needed. In the prior art, when an object needs to be created, a storage element must typically be retrieved from the heap. The object can then be created using the storage element. However, the act of retrieving storage from the heap generally takes a relatively long time, resulting in substantial performance penalties when a storage element is allocated for an object. Furthermore, accesses to storage elements must be serialized on both multi-threaded and/or multi-processor systems. Serializing access to storage elements assures that one storage element cannot be allocated to two different processors or threads. For example, without serialization, it would be possible for two threads to check the storage pool and determine that the same storage element is available, but the storage element can only be allocated to one of the threads. Serialization is the technique used to assure that a storage element can only be allocated to one thread or process.

Storage pools were introduced as a mechanism to cache storage elements from the heap to improve the performance of a computer system by allowing relatively quick retrieval of a storage element from the storage pool rather than performing a much longer access to the heap. This approach provides storage elements that are resident in storage that may be more quickly accessed than the heap, but serialization methods must still be employed. Some programs cannot tolerate the performance penalty of cache misses. One example is a device driver running in a privileged state that must manage steady, uninterruptible (e.g., isochronous) data flows, such as the data flow to the sound system or monitor of a computer system, which cannot have breaks that are perceptible to the end user. The thread managing the device driver's data flow must be able to have storage allocated to it in a manner that does not create unacceptable breaks in the data stream. A thread that must wait for paging to complete for non-resident heap storage due to a cache miss would have difficulty maintaining uninterrupted data flows. Known serialization and storage allocation techniques do not provide the needed performance. Without a mechanism for quickly and efficiently allocating storage for object creation in a serial manner, the computer industry will continue to suffer from performance penalties due to the excessive time it takes to serialize and allocate storage each time an object is created.

DISCLOSURE OF INVENTION

According to preferred embodiments of the present invention, an object oriented storage pool provides enhanced performance by allowing very fast and efficient allocation of storage elements from the storage pool instead of obtaining a storage element from the heap in an object oriented computer system. The storage pool is preferably in a linked-list format, and operations on the linked list to allocate and return storage elements are atomic operations to assure serialization of accesses to the storage pool. The presence and operation of the storage pool is hidden from the user by overloading the New() and delete() methods that are defined in the programming language. In this manner the storage pool can be introduced without modification to existing application software, thereby enhancing computer system performance without changing other software in the system.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 5 is a pseudo-code representation showing how a New() operator in an object oriented language is overloaded in accordance with the preferred embodiments;

FIG. 6 is a pseudo-code representation showing the implementation of the newEntry() method of FIG. 5;

FIG. 7 is a flow diagram showing the steps performed when an object is deleted;

FIG. 8 is a pseudo-code representation showing how a delete() operator in an object oriented language is overloaded in accordance with the preferred embodiments;

FIG. 9 is a pseudo-code representation showing the implementation of the returnEntry() method of FIG. 8.

BEST MODE FOR CARRYING OUT THE INVENTION

Figure 1:
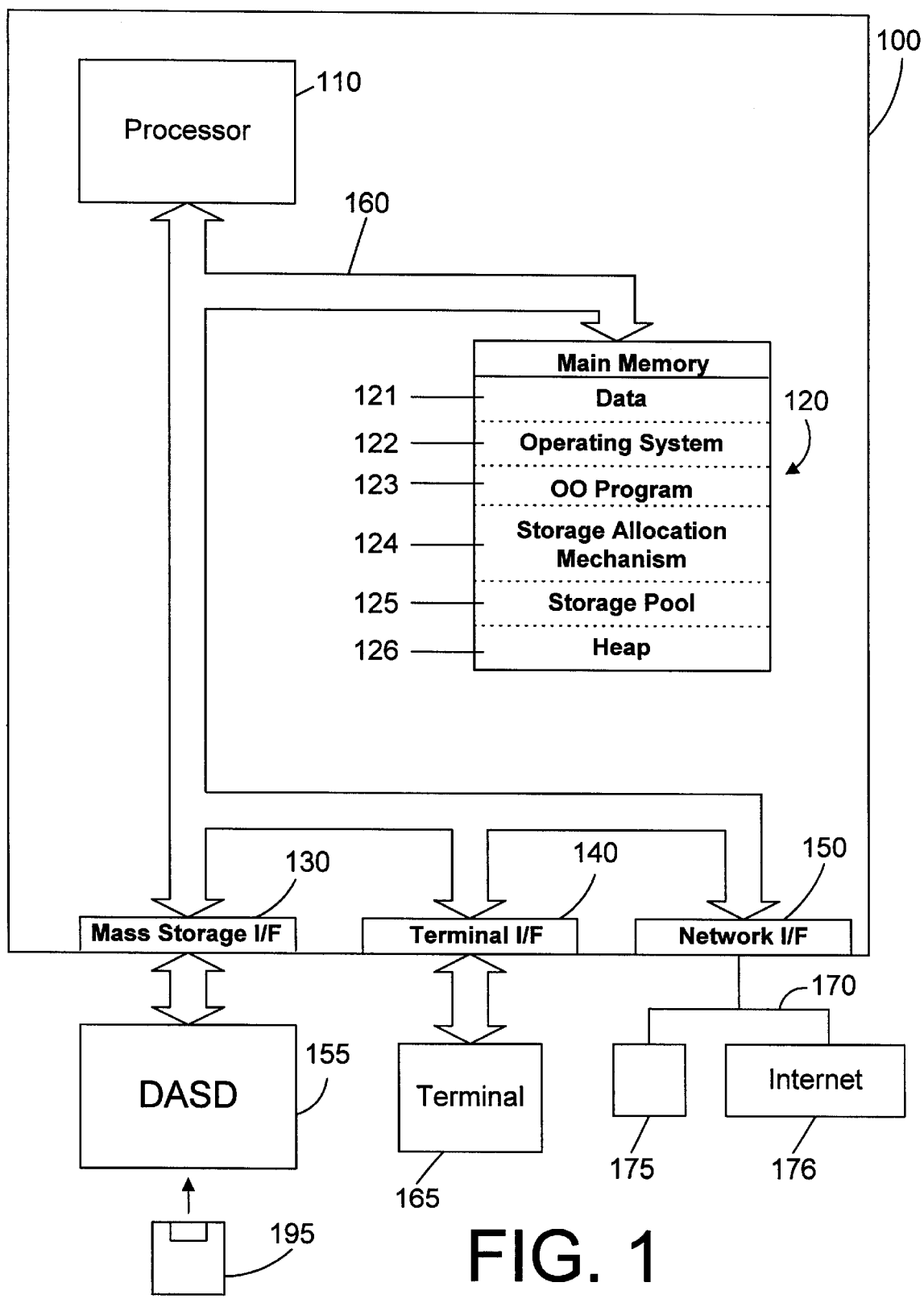
FIG. 1 is a block diagram of an apparatus in accordance with a preferred embodiment of the present invention.

The present invention relates to object oriented programming languages, such as Smalltalk, C++, and Java. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different from that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another. Each of these object oriented programming languages include a method for creating an object and a method for deleting an object. For the sake of convenience, we refer to the method for creating an object as the new() method, and we refer to the method for deleting an object as the delete() method, recognizing that the actual names of these methods may vary from one object oriented programming language to the next. When an object needs to be created, the New() method on the class to be instantiated is invoked. The invocation of the New() method causes a storage element to be allocated, and the constructor on the class is then invoked, which creates the object in the allocated storage element. When the object is no longer needed, the delete() method on the object is invoked, which calls the destructor() method and frees the storage element for later use.

2. Detailed Description

According to preferred embodiments of the present invention, an object oriented storage pool provides enhanced performance by allowing very fast and efficient allocation of storage elements from the storage pool instead of obtaining a storage element from the heap. Operations on the storage pool are atomic operations to assure serialization of accesses to the storage pool. The presence and operation of the storage pool is hidden from the user by overloading the new() and delete() methods that are defined in the programming language. In this manner the storage pool can be introduced without modification to existing application software, thereby enhancing computer system performance without affecting existing code.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 in accordance with the preferred embodiments contains data 121, an operating system 122, an object oriented program 123, a storage allocation mechanism 124, a storage pool 125, and a heap 126. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, object oriented program 123, storage allocation mechanism 124, storage pool 125, and heap 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Operating system 122 preferably supports an object oriented programming environment such as that provided, for example, by the C++ programming language.

Object oriented program 123 is any suitable program that may need to create an object, and may include system software, application software, or any other type of object oriented program. Storage allocation mechanism 124 is the mechanism that allocates a storage element to the object oriented program 123 when an object needs to be created. Storage pool 125 is a storage area that caches storage elements so they can be quickly retrieved from the storage pool instead of allocating a storage element from a heap. Heap 126 is a block of primary storage that can be allocated for object creation as needed. Heap 126 corresponds to known heaps in prior art object oriented computer systems.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
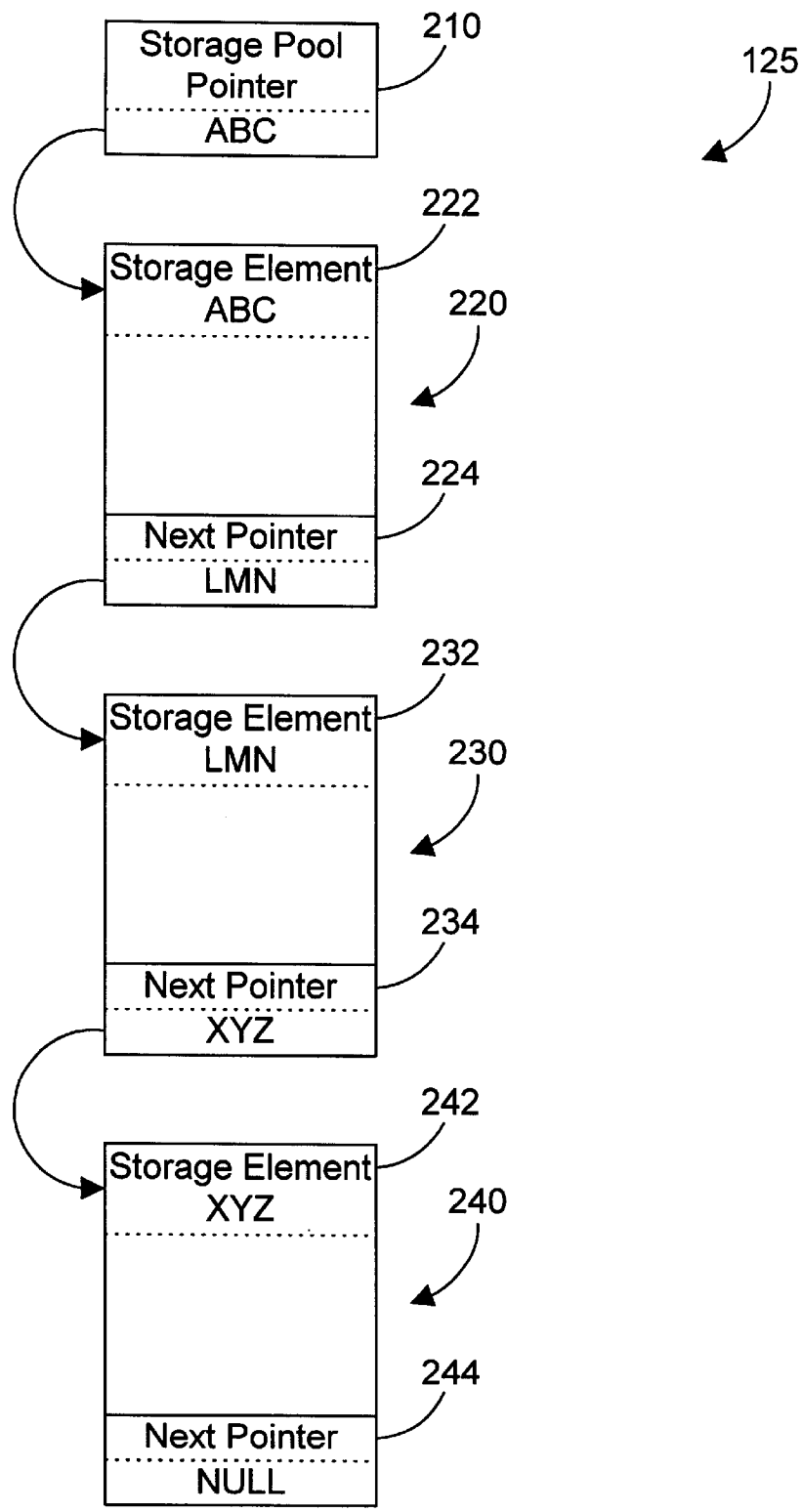
FIG. 2 is a block diagram representation of the storage pool 125 of FIG. 1.

Referring now to FIG. 2, a simple block diagram illustrates one example of storage pool 125 of FIG. 1. Storage pool 125 is a linked list of storage elements that collectively comprise a push-down stack that is used to cache storage elements for later use. For the specific example in FIG. 2, there are three storage elements on the stack, storage element ABC 220, storage element LMN 230, and storage element XYZ 240. Each of these storage elements include a unique identifier 222, 232, and 242, respectively. Each of these storage elements also include a next pointer 224, 234, and 244, respectively, that contains an identifier for the next storage element in the chain, or if the element is the last in the chain, the next pointer contains NULL. Thus, the next pointer 224 of storage element 220 has the value LMN, indicating that storage element LMN follows next in the chain. The next pointer 234 for storage element LMN 230 has the value XYZ, indicating that storage element XYZ follows next in the chain. The next pointer 244 of storage element XYZ has a value of NULL, indicating that storage element XYZ is the last in the list (i.e., at the bottom of the stack). The linked list preferably includes a storage pool pointer 210 that contains the identifier for the first storage element in the linked list (i.e., at the top of the stack). For the example of FIG. 2, storage pool pointer 210 has the value ABC, indicating that storage element ABC 220 is at the top of the stack.

Figure 3:
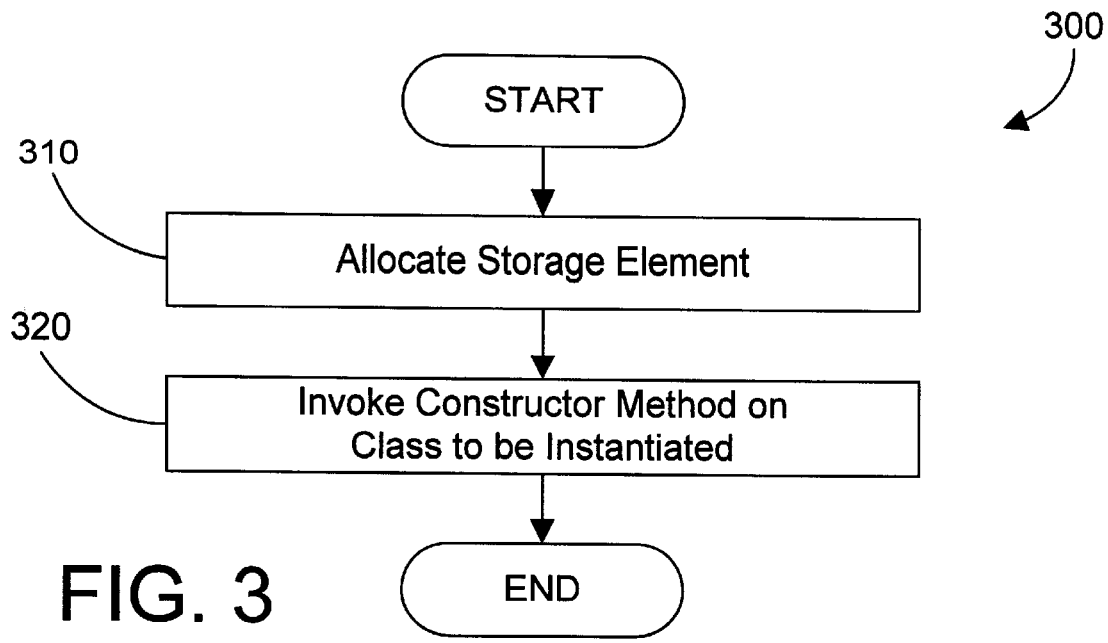
FIG. 3 is a flow diagram showing the steps performed when an object is created.
Figure 4:
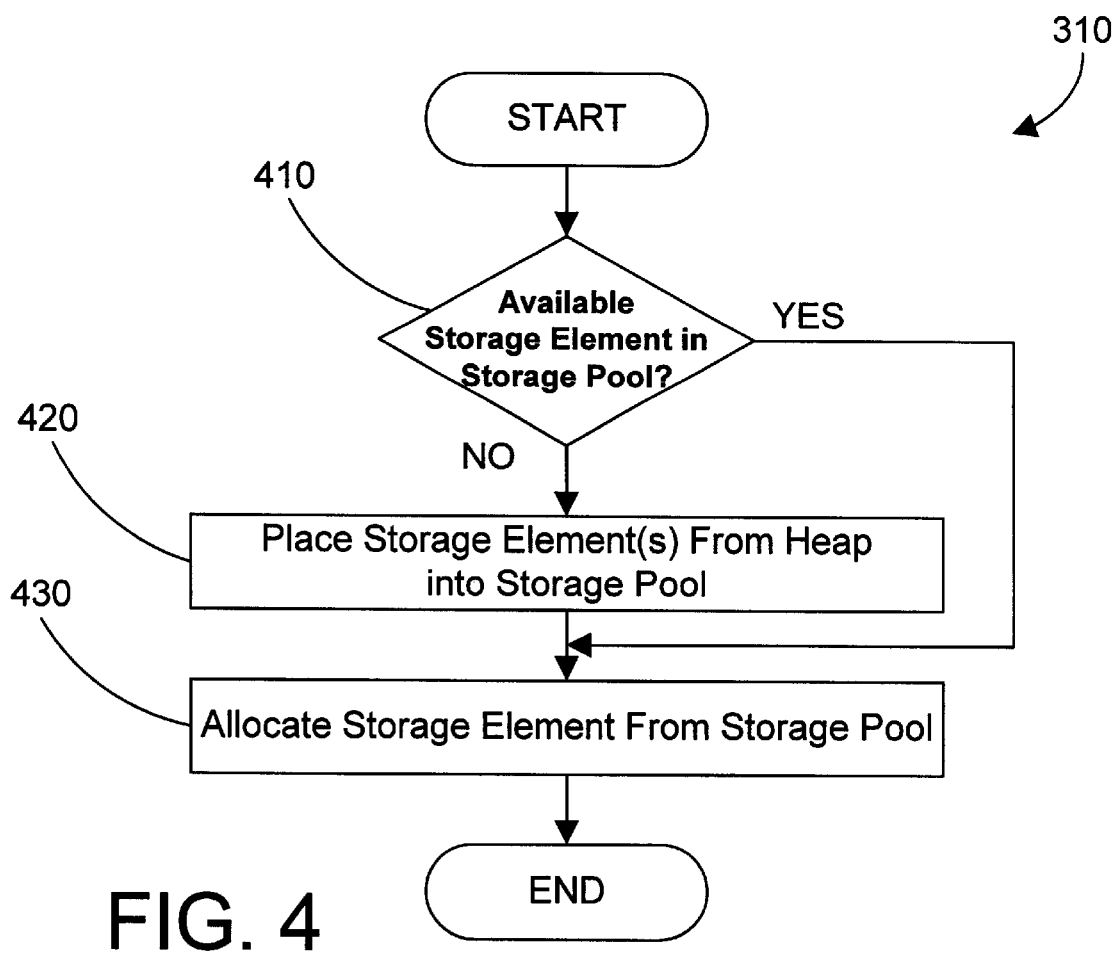
FIG. 4 is a flow diagram showing the steps performed in allocating a storage element in FIG. 3.

Referring now to FIG. 3, method 300 for creating an object includes the steps of allocating a storage element for the object (step 310) and invoking the constructor method on the class to be instantiated (step 320). The present invention is specifically concerned with the step of allocating the storage element 310, the details of which are shown in the flow diagram of FIG. 4. First, step 310 determines whether there are any storage elements available in the storage pool (step 410). If no storage elements are available in the storage pool (step 410=NO), one or more storage elements must be retrieved from the heap and placed in the storage pool (step 420). Once there is one or more storage elements in the storage pool, one of the storage elements can be allocated for the creation of an object (step 430). In accordance with the preferred embodiments, the step 430 of allocating one of the storage elements in the storage pool performs atomic operations on the storage pool to assure serialization of accesses to the storage pool.

The storage allocation mechanism 124 and storage pool 125 of FIG. 1 can be implemented without changing any of the other software that runs on the computer system 100. This is possible by using the concept of overloading operators that are defined in the object oriented programming language. Operator overload is accomplished by substituting a user-defined implementation for certain language-defined methods. We assume for the sake of illustration that the method for creating an object in the object oriented language is the new() method, and that the method for deleting an object in the object oriented language is the delete() method. These language-defined methods are preferably overloaded in the preferred embodiments to provide interaction with the storage pool 125. Referring to FIG. 5, the new() operator is overloaded by providing a call to a method newEntry() that allocates the storage, and then by calling the constructor() method on the class to be instantiated. These two instructions correspond to the two respective steps 310 and 320 of FIG. 3. By overloading the language-defined method that creates a new object, the storage pool 125 and storage allocation mechanism 124 can greatly enhance the performance of a computer system without affecting any other code running on computer system 100. Note that operator overloading is referred to herein to illustrate one specific way of re-defining the language-defined methods for creating and deleting objects. The present invention expressly extends to any suitable way of re-defining any predefined methods, whether presently known or developed in the future.

The pseudo-code for the newEntry() method of FIG. 5 is shown in FIG. 6. The newEntry() method executes instructions that form atomic operations to manipulate the pointers in storage pool 125 to assure serialization of accesses to the storage pool. We assume for the purpose of illustration that the computer system 100 of FIG. 1 is a PowerPC architecture that defines a pair of instructions known as larx and stcx. A larx instruction is a "load and reserve" instruction defined in the PowerPC instruction set that loads the value of a register and sets a reservation on the register. A stcx instruction is a "store and clear reservation" instruction defined in the PowerPC instruction set that verifies that the reservation is still valid, stores a value in the register and clears the reservation on the register. These two instructions are used together to create an atomic operation that allocates a storage element on the top of the stack. Proper use of the larx/stcx instructions allows multiple processors and/or multiple threads to access the same storage in a manner that assures data coherency. Note that other architectures may support similar atomic operations. One known example is the Intel Pentium instruction set, which defines a "lock" instruction (LOCK) and an "exchange" instruction (XCHG) that may be used like the larx/stcx instructions to perform atomic operations on the storage pool. The present invention extends to any instruction, set of instructions, or mechanisms for performing atomic operations on the storage pool, whether now known or developed in the future. For the purpose of this disclosure, an atomic operation is an operation that allows allocating a storage element from the storage pool or returning an element to the storage pool in a manner that assures that no other processors or threads have interfered with the operation.

In instruction 610 of FIG. 6, the variable StoragePoolP corresponds to the storage pool pointer 210 of the stack in FIG. 2. First, the value of the storage pool pointer is read using the ldarx instruction in statement 610. The ldarx instruction is a special form of the larx instruction that reads double words, hence the additional "d" in the instruction. If the value of the storage pool pointer 210 is zero, the break in 610 is executed, which causes the program to exit the do-while loop. If the value of the storage pool pointer is not zero when read using the ldarx instruction at 610, the stdcx instruction at 620 attempts to store the value of the entry's next pointer in the storage pool pointer. The do-while loop is thus exited by either a zero for the entry value, or by having retrieved a non-zero value for the entry and by successfully storing the next pointer of the entry into the storage pool pointer. Once the do-while loop is exited, statement 630 checks to see if the value of the entry is NULL, which indicates that there are currently no storage elements on the stack. If the value of the entry is NULL, the system default new() method defined by the language is invoked in statement 640 to get a storage element of the appropriate size from the heap, and the next pointer of the newly-retrieved storage element is set to NULL in statement 650. The entry is then returned in statement 660.

The operation of the newEntry() method of FIG. 6 may be illustrated using the sample storage pool 125 in FIG. 2. First, statement 610 uses the ldarx instruction to read the value of the storage pool pointer 210, which is ABC, and to place a reservation on the storage pool pointer 210. Statement 620 then stores the value of the next pointer 224, which is LMN, into the storage pool pointer 210 using the stdcx instruction. At this point the do-while loop is exited, and statement 630 tests to see if the entry value is NULL. The entry in this case is ABC, the value retrieved using the ldarx instruction, so statement 630 is false, and statements 640 and 650 are not executed. The entry ABC is then returned in statement 660 as the new entry that may be used to create an object. In this manner, entry ABC is effectively popped off the stack of available storage elements in the storage pool.

The deletion of an object is slightly different compared to the creation of an object, because the delete() method is called on the object to be deleted rather than on the class. Referring to FIG. 7, a method 700 for deleting an object includes the steps of invoking a destructor method on the object (step 710) and returning the storage element to the storage pool (step 720).

FIG. 8 illustrates the operator overloading of the delete() method that is defined by the programming language to delete objects. The delete() method of FIG. 8 is overloaded by calling a destructor method on the object, followed by calling a returnEntry() method to return the newly-freed entry to the storage pool. These methods correspond to the steps 710 and 720 of FIG. 7, respectively. The returnEntry() method of FIG. 8 is shown in more detail in FIG. 9.

An entry is placed back into the storage pool using an atomic combination of larx and stcx instructions. Note that when the returnEntry() method is invoked, the Entry is passed as a parameter. In statement 910, the next pointer of the entry is loaded with the value of the storage pool pointer 210 using the ldarx instruction, and a reservation is placed on the storage pool pointer 210. In statement 920, the value of the entry is placed in the storage pool pointer. These instructions effectively push the new entry on the top of the stack. For the storage pool 125 of FIG. 2, lets assume that returnEntry() is invoked, and an entry DEF is passed as a parameter. The ldarx instruction in statement 910 loads the value of the storage pool pointer, ABC, into the next pointer for the DEF entry. The stdcx statement in 920 then stores the value of the entry, DEF, in the storage pool pointer 210, effectively pushing storage element DEF onto the stack.

Figure 10:
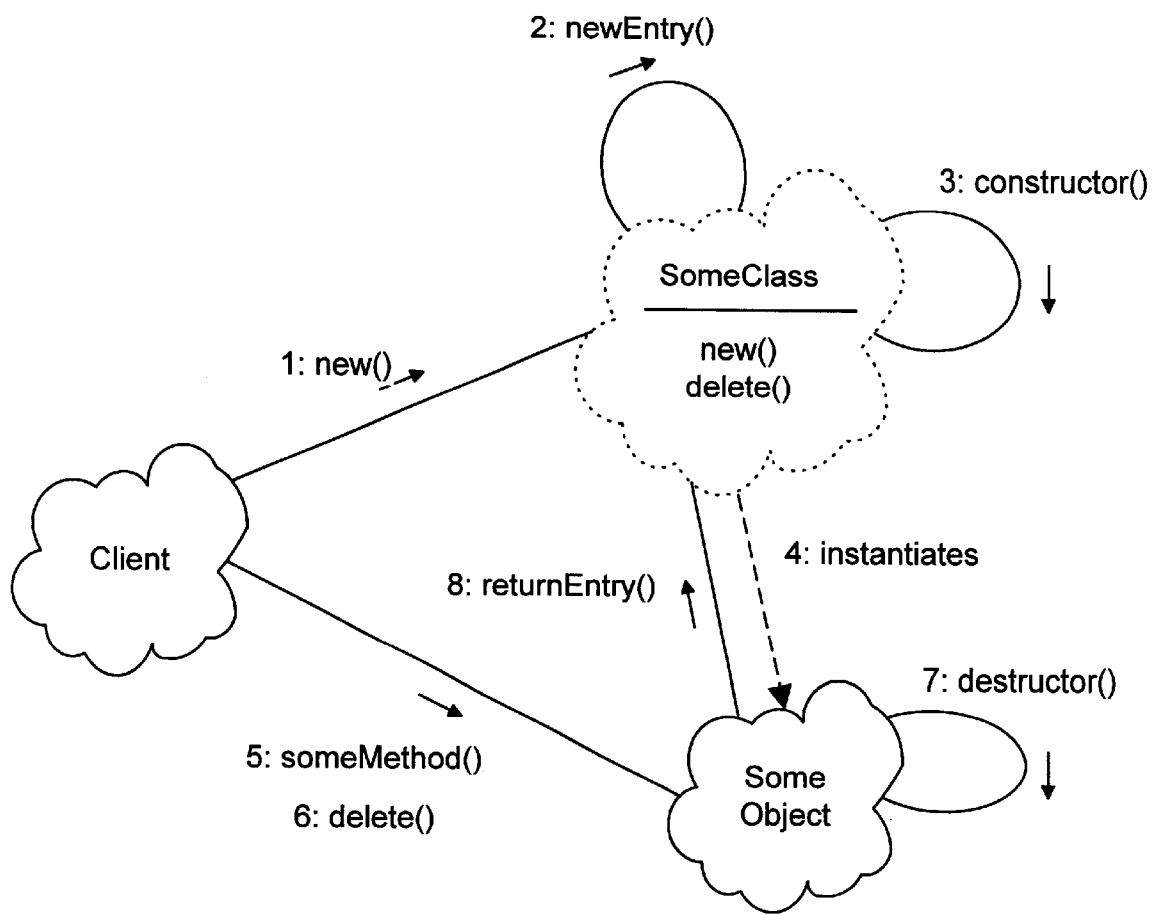
FIG. 10 is an interaction diagram showing an example of the steps performed in creating and deleting an object in accordance with the preferred embodiments.

The interaction diagram of FIG. 10 helps to understand how objects are created and deleted in accordance with the preferred embodiments. A client program first invokes the new() method on SomeClass, indicating that the client program wants an instance of that class. In response, Some-Class does not invoked the system default new() method, but instead executes its own new() method, represented in FIG. 5. SomeClass thus invokes its own newEntry() method (step 2), which corresponds to the newEntry() method of FIG. 6. Next, a constructor() method is invoked on the class (step 3), which causes SomeClass to instantiate an instance Some object of that class (step 4) into the storage element retrieved in step 2. The client then invokes one or more methods on the newly-created object (step 5), represented in FIG. 10 as some method(). Once the client no longer has need of Some object, the client invokes the delete() method on the object (step 6). Because the system default delete() method has been overloaded with the delete() method shown in FIG. 8, the Some object invokes a destructor() method (step 7), followed by invoking the returnEntry() method (step 8), which returns the storage element that was used for Some object to the storage pool by pushing the storage element on the stack.

The preferred embodiments described herein provide significant advantages over the prior art. First of all, the storage pool is operated on in an atomic fashion to assure that accesses to the storage elements in the storage pool by different processors or threads are serialized. The atomic operations are very fast, allowing the storage pool to provide significant performance advantages while still maintaining the serialization of accesses to the storage pool. Second, the most recently used storage will be available at the top of the push-down stack. Storage that is most recently used is more likely to still be in main memory rather that having been paged out to mass storage. Third, the storage pool is polymorphic, allowing these significant performance enhancements to be realized by overloading existing methods (such as new() and delete()) that are defined in object oriented programming languages to create and delete objects. In this manner, a client program invokes new() when it needs a new storage element, and the allocation methods and mechanisms of the invention are all performed under the covers, completely transparent to the client. This allows the storage pool of the present invention to be implemented without requiring changes to existing code.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. These and other variations are within the scope of the present invention.

We claim:

1. An apparatus comprising:

at least one processor;

a memory coupled to the at least one processor;

a primary storage residing in the memory, the primary storage containing a plurality of storage elements;

a storage pool residing in the memory containing a plurality of storage elements that are retrieved from the primary storage, the storage elements in the storage pool each having at least one pointer, the plurality of storage elements and associated pointers forming a linked list;

a storage allocation mechanism residing in the memory that allocates at least one of the storage elements in the storage pool when an object needs to be created, the storage allocation mechanism retrieving a storage element from the storage pool using an atomic operation on the pointers and returning a storage element to the storage pool using an atomic operation on the pointers.

2. The apparatus of claim 1 wherein the storage allocation mechanism is invoked automatically when a program invokes a method on a class that creates a new object.

3. The apparatus of claim 2 wherein the invocation of the storage allocation mechanism is transparent to the program that invokes the method on the class that creates the new object.

4. The apparatus of claim 1 wherein the storage allocation mechanism is invoked automatically when a program invokes a method on an object to delete the object.

5. The apparatus of claim 4 wherein the invocation of the storage allocation mechanism is transparent to the program that invokes the delete method on the object.

6. The apparatus of claim 1 wherein the storage allocation mechanism serializes access to the storage elements in the storage pool and in the primary storage.

7. An apparatus comprising:

at least one processor;

a memory coupled to the at least one processor;

primary storage means residing in the memory for storing a plurality of storage elements;

storage pool means residing in the memory for storing a plurality of storage elements that are retrieved from the primary storage means, the storage elements in the storage pool means each having at least one pointer, the plurality of storage elements and associated pointers forming a linked list;

storage allocation means residing in the memory for serializing access to the plurality of storage elements in the storage pool means by allocating at least one of the storage elements in the storage pool means when an object needs to be created using an atomic operation on the pointers and returning a storage element to the storage pool means using an atomic operation on the pointers, the storage allocation means being invoked automatically when a program invokes a method on a class that creates a new object or invokes a method on an object to delete the object, the invocation of the storage allocation mechanism being transparent to the program that invokes the method that creates a new object and being transparent to the program that invokes the method to delete the object.

8. A method for allocating storage for object creation in an object oriented computer system, the method comprising the steps of:

(A) providing a storage pool containing a plurality of storage elements that are retrieved from primary storage, the storage elements in the storage pool each having at least one pointer, the plurality of storage elements and associated pointers forming a linked list; and (B) manipulating a plurality of the pointers in atomic fashion to allocate at least one of the plurality of storage elements in the storage pool.

9. The method of claim 8 further comprising the step of overloading the method defined in the object oriented computer system to create a new object so that invoking the method results in performing step (B).

10. The method of claim 8 further comprising the steps of:

(C) manipulating a plurality of the pointers in atomic fashion to return at least one storage element to the storage pool.

11. The method of claim 10 further comprising the step of overloading the method defined in the object oriented computer system to delete an object so that invoking the method results in performing step (C).

12. A method for serializing access to a plurality of storage elements in an object oriented computer system, the method comprising the steps of:

(A) providing a storage pool containing the plurality of storage elements that are retrieved from primary storage, the storage elements in the storage pool each having at least one pointer, the plurality of storage elements and associated pointers forming a linked list;

(B) overloading an object method defined in the object oriented computer system to create a new object so that invoking the method results in manipulating a plurality of the pointers in atomic fashion to allocate at least one of the plurality of storage elements in the storage pool; and (C) overloading an object method defined in the object oriented computer system to delete an object so that invoking the method results in manipulating a plurality of the pointers in atomic fashion to return at least one storage element to the storage pool.

13. A program product comprising:

a storage allocation mechanism that allocates at least one of a plurality of storage elements in a storage pool when an object needs to be created, the storage allocation mechanism retrieving a storage element from the storage pool using an atomic operation on pointers in the storage pool and returning a storage element to the storage pool using an atomic operation on the pointers; and signal bearing media bearing the storage allocation mechanism.

14. The program product of claim 13 wherein the signal bearing media comprises recordable media.

15. The program product of claim 13 wherein the signal bearing media comprises transmission media.

16. The program product of claim 13 wherein the storage allocation mechanism is invoked automatically when a program invokes a method on a class that creates a new object.

17. The program product of claim 16 wherein the invocation of the storage allocation mechanism is transparent to the program that invokes the method on the class that creates the new object.

18. The program product of claim 13 wherein the storage allocation mechanism is invoked automatically when a program invokes a method on an object to delete the object.

19. The program product of claim 18 wherein the invocation of the storage allocation mechanism is transparent to the program that invokes the delete method on the object.

20. The program product of claim 13 wherein the storage allocation mechanism serializes access to the storage elements in the storage pool and in the primary storage.

* * * * *